| United States Patent [19] | [11] Patent Number: 4,810,482 |
| Iwao et al. | [45] Date of Patent: * Mar. 7, 1989 |

[54] PROCESS FOR PRODUCING SILANES

[75] Inventors: Tetsuya Iwao, Osaka; Yoshiaki Toyoda, Tokyo; Kazuo Wakimura, Osaka; Nobuhiro Kitano, Osaka; Masao Tanaka, Osaka, all of Japan

[73] Assignee: Mitsui Toatsu Chemicals, Inc., Tokyo, Japan

[*] Notice: The portion of the term of this patent subsequent to Sep. 17, 2002 has been disclaimed.

[21] Appl. No.: 644,722

[22] PCT Filed: Dec. 21, 1983

[86] PCT No.: PCT/JP83/00449

§ 371 Date: Aug. 16, 1984

§ 102(e) Date: Aug. 16, 1984

[87] PCT Pub. No.: WO84/02517

PCT Pub. Date: Jul. 5, 1984

[30] Foreign Application Priority Data

Dec. 21, 1982 [JP] Japan ................. 57-223008

[51] Int. Cl.$^4$ ............................. C01B 33/04
[52] U.S. Cl. ................................... 423/347
[58] Field of Search ................. 423/347; 556/474

[56] References Cited

U.S. PATENT DOCUMENTS 3,496,206  2/1970  Berger .................. 556/474

FOREIGN PATENT DOCUMENTS 57-209815  12/1982  Japan ................. 423/347
8300140     1/1983  PCT Int'l Appl. .... 423/347

*Primary Examiner*—Jack Cooper
*Attorney, Agent, or Firm*—Kane, Dalsimer, Sullivan, Kurucz, Levy, Eisele & Richard

[57] ABSTRACT

There is disclosed a process for producing silanes by reducing polyhalosilane with a mixture of alkyl aluminum hydride and trialkyl aluminum, in which a treatment for reducing the content of trialkyl aluminum in the mixture is lowered to 10 mol. % or less of alkyl aluminum hydride prior to the reduction reaction.

As to methods for reducing the content of trialkyl aluminum in the mixture, there are provided, for example, distillation, recrystallization, separation by complex formation, pyrolysis of trialkyl aluminum and decomposition by hydrogenation of trialkyl aluminum.

2 Claims, No Drawings

PROCESS FOR PRODUCING SILANES

BACKGROUND OF THE INVENTION

1. Field of the Invention

The present invention relates to a process for producing silanes by reducing polyhalosilane with use of a mixture of alkyl aluminum hydride and trialkyl aluminum as a reducing agent.

2. Description of the Prior Art

Silanes are industrially important compounds useful for various purposes such as the raw materials for organic and inorganic syntheses, fuel, catalyst etc.

Production of silanes by reducing polyhalosilane with alkyl aluminum hydride or the like is already known.

For example, the Japanese Patent Publication No. Sho 36-517, British Pat. No. 823,483, German Pats. Nos. 1,055,511 and 1,117,090 disclose the addition of a small amount of diethyl aluminum monochloride in the reduction of tetrachlorosilane with sodium hydride.

However, as will be apparent from the amount of use, said diethyl aluminum monochloride is simply used, through the formation of a certain complex, for activating sodium hydride by solubilizing the same which is practically insoluble in the solvent.

Also the French Pat. No. 1,499,032 discloses a process of reducing halosilane with highly pure alkyl aluminum hydride.

However, alkyl aluminum hydride, being industrially synthesized from metallic aluminum, hydrogen and trialkyl aluminum, is inevitably obtained as a mixture containing unreacted trialkyl aluminum, so that easily available inexpensive alkyl aluminum hydride is generally in the form of such mixture. Such mixture, if employed simply in the reduction of polyhalosilane, will not only result in a significantly lower yield of silanes than in the case of reduction with highly pure alkyl aluminum hydride but also lead to an increased formation of halosilanes, such as monochlorosilane, presumably from incomplete reduction of polyhalosilane and of ethane resulting from by-reactions.

For such reason, highly pure alkyl aluminum hydride has to be separated by distillation from the above-mentioned mixture, but in practice complete separation by distillation alone is extremely difficult because alkyl aluminum hydride and trialkyl aluminum not only have very close boiling points in certain systems but also form an azeotropic system.

SUMMARY OF THE INVENTION

In consideration of the foregoing, the object of the present invention is to provide a process for producing highly pure silanes with a high yield and with significantly reduce formation of by-products such as monochlorosilanes or ethane through reduction of polyhalosilane with the easily available inexpensive mixture of alkyl aluminum hydride and trialkyl aluminum.

The above-mentioned object is achieved, according to the present invention, by a process of producing silanes by reducing polyhalosilane with a mixture of alkyl aluminum hydride and trialkyl aluminum, said process being featured by a step of reducing the amount of trialkyl aluminum present in said mixture to equal to or less than 10 mol. % of alkyl aluminum hydride prior to said reduction reaction.

DETAILED DESCRIPTION OF THE PREFERRED EMBODIMENTS

Polyhalosilane employed as the starting material in the present invention is a compound of the general formula $Si_nX_{2n+2}$ wherein n is a positive integer and X's are substituent radicals selected from a group consisting of halogen atoms, a hydrogen atom, alkyl radicals, alkoxy radicals, aryl radicals and vinyl radicals. Such substituents usually contain at least a halogen atom, but may also be free of halogen atoms and solely composed of alkoxy radicals, aryl radicals and/or vinyl radicals. Examples of halogen atom include fluorine, chlorine, bromine and iodine atoms while those of alkyl radical include methyl, ethyl, n-propyl, isopropyl, n-butyl, isobutyl, sec-butyl, pentyl, hexyl, heptyl, octyl, nonyl and decyl radicals, those of alkoxy radicals include methoxy, ethoxy, n-propoxy, isobutoxy and sec-butoxy radicals, those of aryl radical include phenyl, p-methylphenyl, n-methylphenyl, o-methylphenyl, p-ethylphenyl, m-ethylphenyl and o-ethylphenyl radicals, and those of vinyl radical include vinyl, allyl and isopropenyl radicals.

Among polyhalosilanes represented by the above-mentioned general formula, particularly preferred examples for use in the present invention include tetrachlorosilane, hexachlorodisilane, octachlorotrisilane, tetraethoxysilane, diethyldichlorosilane, trichlorosilane, dichlorosilane and monochlorosilane.

Alkyl aluminum hydride constituting the principal component in the reducing mixture employed in the present invention is a reducing compound represented by a general formula $R_2AlH$, wherein R's are same or different alkyl radicals having 1 to 10 carbon atoms such as methyl, ethyl, n-propyl, iso-propyl, n-butyl, iso-butyl, sec-butyl, pentyl, hexyl, heptyl, octyl, nonyl or decyl radical. Among alkyl aluminum hydrides represented by the above-mentioned general formula, particularly preferred examples include dimethyl aluminum hydride, diethyl aluminum hydride and diisobutyl aluminum hydride.

Trialkyl aluminum contained in the reducing mixture employed in the present invention is a compound represented by a general formula $R_3Al$, wherein R's are same or different alkyl radicals having 1 to 10 carbon atoms such as methyl, ethyl, n-propyl, iso-propyl, n-butyl, iso-butyl, sec-butyl, pentyl, hexyl, heptyl, octyl, nonyl or decyl radical. Among trialkyl aluminums represented by the foregoing general formula, those most frequently present are trimethyl aluminum, triethyl aluminum and triisobutyl aluminum.

Such trialkyl aluminums are present in said mixture usually in an amount of 20 to 300 mol. % to alkyl aluminum hydride.

According to the present invention, the mixture of trialkyl aluminum and alkyl aluminum hydride is treated to remove the former, of which content after said treatment should not exceed 10 mol. %, preferably 8 mol. %, of alkyl aluminum hydride.

A content of trialkyl aluminum exceeding 10 mol. % significantly reduces the yield of the desired compound and gives rise to a significant formation of ethane and halosilanes obtained in case of incomplete reduction.

The process of the present invention is featured by eliminating trialkyl aluminum, present in the mixture of alkyl aluminum hydride and trialkyl aluminum, to 10 mol. % or less of alkyl aluminum hydride, and said elimination may be achieved by an already known unit operation or reaction.

Examples of such eliminating method include distillation, recrystallization, separation by complex formation, pyrolysis of trialkyl aluminum and decomposition of hydrogenation of trialkyl aluminum.

Among such methods particularly preferred is the addition of an alkyl aluminum halide capable of converting trialkyl aluminum into dialkyl aluminum monohalide, such as ethyl aluminum dichloride, ethyl aluminum sesquichloride, isobutyl aluminum dichloride or aluminum chloride.

Such alkyl aluminum halides are represented by a general formula $AlR_nX_{3-n}$, wherein R stands for an alkyl radical having 1 to 10 carbon atoms such as methyl, ethyl, n-propyl, iso-propyl, n-butyl, iso-butyl, sec-butyl, pentyl, hexyl, heptyl, octyl, nonyl or decyl radical, and X stands for a halogen atom such as fluorine, chlorine, bromine or iodine atoms. n stands for a number 0, 1 or 1.5. In case n = 0, the above-mentioned general formula represents aluminum trihalides not including alkyl radicals, for example aluminum trichloride.

Among the compounds represented by said general formula, particularly preferred examples include methyl aluminum dichloride, methyl aluminum sesquichloride, ethyl aluminum dichloride, ethyl aluminum sesquichloride, isobutyl aluminum dichloride, iso-butyl aluminum sesquichloride, aluminum trichloride (aluminum chloride), methyl aluminum dibromide, methyl aluminum sesquibromide, ethyl aluminum dibromide, ethyl aluminum sesquibromide, isobutyl aluminum dibromide, isobutyl aluminum sesquibromide and aluminum tribromide (aluminum bromide), which may be employed singly or as mixture.

The alkyl radicals in alkyl aluminum hydride and in trialkyl aluminum present in said mixture and the alkyl radicals in alkyl aluminum halide to be added to said mixture may be all same or different.

According to the present invention, the amount of trialkyl aluminum in said mixture can be easily reduced to 10 mol. % or less or alkyl aluminum hydride by the addition of such alkyl aluminum halide as explained above, in accordance to said mixture, in such an amount enough for achieving such purpose.

The stoichiometrically required number of moles of alkyl aluminum halide can be calculated according to the following formulae, in consideration of the amount of halogen atoms contained therein and of the amount trialkyl aluminum present in the mixture employed in the reduction reaction.

According to the present invention, alkyl aluminum di-, sesqui-, and tri-halides react with trialkyl aluminum to form dialkyl aluminum monohalides according to the following reaction formulae:

    (1)

    (2)

    (3)

As shown by the equations (1) and (2), alkyl aluminum dihalide or alkyl aluminum sesquihalide reacts in an equimolar ratio with trialkyl aluminum to form alkyl aluminum monohalide, but aluminum trihalide react, in a half molar amount as shown in the equation (3), with trialkyl aluminum to form alkyl aluminum monohalide.

In fact the above-mentioned reactions (1), (2) and (3) can be considered to proceed in an almost stoichiometric manner, so that the amount of alkyl aluminum halide to be added for decreasing the content of trialkyl aluminum to 10 mol. % or less can be easily calculated from the initial content thereof in relation to alkyl aluminum hydride present in the mixture.

As an example, if said initial content of trialkyl aluminum in the mixture is 200 mol. %, there may added alkyl aluminum halide in an amount enough for reacting at least 95% of trialkyl aluminum present.

If the added amount of alkyl aluminum halide is insufficient for decreasing the content of trialkyl aluminum to 10 mol. % or less, there is scarcely achieved the object of the present invention to significantly improve the yield of silanes and to significantly reduce by-products such as monochlorosilane and ethane or the like.

The addition of alkyl aluminum halide to said mixture may be conducted in an arbitrary manner, for example direct mixing of the two or mixing after either or both are diluted with a suitable solvent. Both components are usually liquid, but either component, if solid, may be dissolved or suspended in a solvent before mixing. Said mixing, being strongly exothermic in most cases, has to be carefully conducted in order to avoid overheating of the system. More specifically, it is preferable to charge either component in a container equipped with cooling and agitating means and to dropwise add the other under cooling and agitation and at a rate allowing temperature control thereby maintaining the temperature of the system at approximately 40° C. The aforementioned reactions, being generally very rapid, can be considered practically complete at the end of the addition, but reaction is preferably extended for 10 to 20 minutes for safety. In a suspended system, heating up to about 70° C. is preferable for accelerating the reaction.

It is to be noted, when the remaining content of trialkyl aluminum in the mixture is lowered to 10 mol. % or lower of alkyl aluminum hydride by the addition of alkyl aluminum halide, that dialkyl aluminum monohalide resulting in the mixture need not be separated therefrom before the reduction reaction.

Rather inversely, thus resulting dialkyl aluminum monohalide, if present in an amount equal to 3 mol. % or higher, brings about an advantage of effectively suppressing the formation of halosilanes which are presumably generated in the reduction reaction by incomplete reduction of polyhalosilane.

The mixture of alkyl aluminum hydride and trialkyl aluminum often contains metallic aluminum in the form of fine powder, but the presence of such metallic aluminum does not hinder the execution of the process of the present invention.

According to the present invention, silanes are produced by reducing polyhalosilane with the mixture of alkyl aluminum hydride in which the content of trialkyl aluminum is controlled to a determined range in advance by the addition of alkyl aluminum halide.

The above-mentioned reaction of reducing polyhalosilane include all reactions for producing silanes from polyhalosilanes defined before.

Consequently the reduction reaction of the present invention includes not only a reaction:

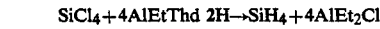

but also other reactions in which halogens are practically not involved, such as:

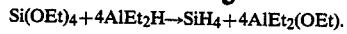

Said reduction reaction can be conducted in known manner as a usual liquid-to-liquid reaction, but it is to be noted that almost all the starting material, reducing agent and resulting substances are extremely active materials which are easily decomposed or generate fire by reaction with oxygen or moisture. Consequently said reaction has to be carried out in an inert atmosphere, completely free from oxygen and moisture. Thus the reaction system has to be completely sealed with an inert gas such as helium, neon, argon or xenon or a gas inactive to the reaction system such as nitrogen or hydrogen, which should be sufficiently deoxygenated and dried.

The reaction apparatus to be employed in said reduction reaction is preferably a usual reactor for liquid-to-liquid reaction equipped with an agitator and a heat-eliminating means, and, because of the above-mentioned reason, has to be constructed as a completely closed system including the pipings attached thereto and the condenser for the resulting gaseous silanes.

The above-described apparatus for reduction reaction may also be used for adding and mixing alkyl aluminum halide to the mixture of alkyl aluminum hydride. It is therefore possible, in said apparatus, to at first effect the treatment of said mixture and then to conduct said reduction reaction by introducing polyhalosilanes.

The reaction temperature in the process of the present invention has to be maintained in a range from $-30°$ to $100°$ C., preferably from $0°$ to $80°$ C., most preferably from $30°$ to $50°$ C., since a lower reaction temperature is practically insufficient for the execution of the reaction while a higher reaction temperature results not only in spontaneous decomposition of alkyl aluminum hydride but also in undesired by-reactions.

Said reduction reactions, being strongly exothermic, requires heating only at the start thereof. Once the reaction is initiated, the reaction proceeds automatically by the heat of reaction, and the reaction system is maintained at the desired reaction temperature by cooling. Said reduction reaction may be conducted in a batch process in which the mixture of alkyl aluminum hydride and polyhalosilane are both charged and reacted in the reaction, or in a semi-batch process in which either component, for example said mixture alone, is charged in the reactor while the other, for example polyhalosilane, is added thereto. The latter process has an advantage of controlling the reaction speed, and consequently the amount of heat of reaction, by the rate of addition of polyhalosilane. Naturally said reaction may also be conducted in continuous manner by continuously introducing the both components into the reactor and removing the reaction products also in continuous manner.

The reaction is usually conducted under a pressure ranging from atmospheric pressure to 2 kg/cm2 (gage pressure), but may also be effected under a reduced or increased pressure in relation to the reaction temperature or reaction apparatus employed.

Said reduction reaction, being very fast in nature, is considered practically complete when the mixing of both components is completed. Consequently, for example in the above-mentioned semi-batch process, the operation may be terminated if the reaction is continued for 10 to 30 minutes after the addition of polyhalosilane is completed. Also the end point of the reaction may be easily determined from the termination of generation of silanes or by the start of decline of measured temperature at the termination of exothermic reaction. Naturally the end point of the reaction can be most securely determined by the analysis of the composition of the reaction system or of the reaction products.

The generated silane gas is liquified or solidified by introducing it into a condenser cooled with liquid nitrogen or the like and then collected.

In the reduction reaction in the process of the present invention, the use of a reaction solvent is not essentially but is generally preferable in view of decelerating the reaction and thus facilitating the control thereof.

The reaction solvent, if employed, is preferably a non-polar solvent not reacting with alkyl aluminum monohalide nor forming a complex therewith in order to facilitate recovery of said alkyl aluminum monohalide after the reduction reaction. Examples of such reaction solvent include aliphatic saturated hydrocarbons and aromatic hydrocarbons such as heptane, octane, liquid paraffin, benzene, toluene and xylene. Reactive solvents such as carbon tetrachloride are not usable in said reactions.

Certain polar solvents such as diethylether or tetrahydrofuran may be employed for accelerating the reaction at a lower temperature, but, in such case the separating operation becomes extremely difficult since such solvent forms a complex, which is not easily separable by a unit operation such as distillation, with alkyl aluminum monohalide.

As explained in the foregoing, the present invention enables to produce silanes with a high yield by reducing polyhalosilane with the mixture of alkyl aluminum hydride and trialkyl aluminum, and such technical concept is applicable also to the conventionally known reduction of polyhalosilane with alkyl aluminum hydride.

Thus the present invention provides a process for producing silanes by reducing polyhalosilane with alkyl aluminum hydride, which comprises adding alkyl aluminum halide, to said alkyl aluminum hydride, in an amount at least equal to 3 mol. % of said alkyl aluminum hydride.

The amount of alkyl aluminum halide to be added according to the present invention is at least equal to 3 mol. %, preferably at least equal to 5 mol. %, of alkyl aluminum hydride. The upper limit of said amount of addition is not specified, but an excessively large addition lowers the concentration of alkyl aluminum hydride and increases the total amount of alkyl aluminum compounds, thus leading to industrial disadvantages such as a lowered reaction speed, an increased volume of reactor, an increased heat required in the reaction etc. The alkyl aluminum halides are available with four different halogen-to-aluminum ratios X/Al = 1, 1.5, 2 or 3, and the effect of addition becomes larger at a higher X/Al ratio for a given number of moles. More specifically, the effect of addition becomes smaller in the order of aluminum trihalide, alkyl aluminum dihalide, alkyl aluminum sesquihalide and dialkyl aluminum halide.

Aluminum trihalide, being in solid form, poses difficulty in the handling and mixing. For this reason most preferred is alkyl aluminum dihalide. The higher effect of addition for a compound with a higher X/Al ratio, for example is higher Cl/Al ratio, is ascribable presumably to a solvent effect, a catalytic effect or a change in the intermolecular ring structure formed by the alkyl aluminum compounds in the solvent, but is not known for certain.

The reaction of the present invention gives rise to the formation of dialkyl aluminum monohalide according to the following reaction equation:

$$4AlR_2H + SiX_4 \rightarrow 4AlR_2X + SiH_4.$$

Consequently, except in the initial period of the reaction, alkyl aluminum monohalide becomes present with alkyl aluminum hydride.

Surprisingly, however, the addition of alkyl aluminum halide to alkyl aluminum hydride prior to the start of reduction reaction according to the present invention provides an effect exceeding the expected initial compensation according to the above-mentioned reaction equation, namely an effect of increasing the yield and particularly decreasing the impurities in significant manner. The addition of alkyl aluminum halide to alkyl aluminum hydride may be conducted either by direct mixing of the two or by mixing the two after dilution with solvent. Said mixing, being usually exothermic, should be conducted so as to avoid excessive heating.

The process of the present invention provides various silanes such as monosilane, disilane, diethyldihydrosilane etc. which are industrially important substances for use as starting materials for organic and inorganic syntheses, fuels, catalysts etc.

In addition, monosilane produced by the process of the present invention, being characterized by low impurity contents, may be employed as the raw material for semiconductor production with or without simple purification process.

Now the present invention will be further clarified by the following examples, but the present invention will by no means be limited by these examples.

EXAMPLE 1

A 500 ml stainless steel autoclave equipped with an induction stirrer was connected through a gas flow meter to a 500 ml stainless steel gas trap, and also connected to a constant rate pump for charging silicon tetrachloride dissolved in liquid paraffin through a dip tube. The entire system was filled with helium prior to the reaction, and the gas trap was cooled with liquid nitrogen.

A mixture (200 g) of diethyl aluminum hydride (60 wt.%) and triethyl aluminum was distilled under a reduced pressure to obtain, after a first fraction or triethyl aluminum (b.p. 55°–65° C./0.7 mmHg), 99 g of diethyl aluminum hydride (b.p. 65°–75° C./0.7 mmHg) containing triethyl aluminum at a concentration of 2 mol. %.

35.3 g of said hydride was diluted in 50 g of liquid paraffin. The amounts of diethyl aluminum hydride and triethyl aluminum were 0.4 mols and 0.008 mols, respectively.

The obtained mixture was charged in said 500 ml autoclave, then degassed for 20 minutes under a pressure of 2 mmHg, and was maintained in helium atmosphere.

17.0 g (0.1 mols) of silicon tetrachloride dissolved in 28 g of liquid paraffin was supplied by the constant rate pump during 2 hours into the autoclave maintained at 50° C., and the generated gaseous monosilane was collected in the gas trap.

After the completion of the reaction, the gaseous monosilane remaining in the system was purged into the gas trap and collected therein by helium gas. The gas composition in the trap was measured by a gas chromatograph. The production of monosilane gas was 1.79 % under normal condition, corresponding to an yield of 80%.

The ratio of ethane produced to monosilane (ethane/SiH$_4$) was 0.31%, and the ratio of monochlorosilane to monosilane (SiH$_3$Cl/SiH$_4$) was 3900 ppm.

REFERENCE EXAMPLE 1

The process of the Example 1 was reproduced except that 57.2 g of the mixture before the separation by distillation, containing 0.4 mols of diethyl aluminum hydride and 0.2 mols of triethyl aluminum, was employed as the reducing agent. The production of monosilane was 0.34 % under normal condition, corresponding to an yield of 14%.

The ratio of ethane SiH$_4$ was 1.4%.

The ratio of SiH$_3$Cl/SiH$_4$ was 2.0%.

EXAMPLES 2, 3 AND REFERENCE EXAMPLES 2, 3

There was investigated the effect of triethyl aluminum remaining in diethyl aluminum hydride after the elimination of triethyl aluminum by distillation from a mixture of the two.

The process and the apparatus was same as those in the Example 1.

The experimental conditions and results are summarized in Tab. 1.

TABLE 1

| | AlEt$_3$ AlEt$_2$H (mol. %) | Yield (%) | Ethane SiH$_4$ (%) | SiH$_3$Cl SiH$_4$ (ppm) |
|---|---|---|---|---|
| Example 2 | 7 | 83 | 0.28 | 3800 |
| Example 3 | 10 | 77 | 0.30 | 5100 |
| Reference Example 2 | 13 | 38 | 0.74 | 16200 |
| Reference Example 3 | 20 | 19 | 1.71 | 19000 |

The results shown in Tab. 1 indicate that the amount of triethyl aluminum should be reduced to 10 mol. % or less of diethyl aluminum hydride.

EXAMPLE 4

569 g of a mixture of diethyl aluminum hydride (43 wt.%), triethyl aluminum and a small amount of tri-n-butyl aluminum was charged, with 42.3 g of powdered aluminum, in a 3 % stainless steel autoclave.

The mixture was agitated for 4 hours at 130° C. in an atmosphere of hydrogen at a pressure of ca. 140 kg/cm$^2$ (gage pressure) to decompose triethyl aluminum.

After the reaction, the reaction mixture was filtered to obtain 539 g of a colorless transparent liquid, which contained 92.4 mol. % of diethyl aluminum hydride, 6.3 mol.% of triethyl aluminum and 1.3 mol. % of tri-n-butyl aluminum.

This mixture 41.5 g was employed in the synthesis of monosilane according to the conditions described in the Example 1 except that helium was replaced by hydrogen.

In this case the amount of diethyl aluminum hydride employed was 0.44 moles.

The production of gaseous monosilane was 1.8 % under normal condition, corresponding to an yield of 81%.

The ratio of ethane produced to monosilane was 0.29%, and that of monochlorosilane to monosilane was 2900 ppm.

EXAMPLE 5

708 g of a mixture of diisobutyl aluminum hydride (52 mol. %) and triisobutyl aluminum was charged in a four-necked flask equipped with a reflux condenser and sealed with nitrogen.

The flask was gently heated on an oil bath at 160°–180° C., and the heating was maintained for ca. 12 hours to decompose triisobutyl aluminum in such controlled manner that the generation of isobutylene gas did not become excessively vigorous. When the reaction was nearly complete, the flask was cooled to 100°–120° C. and nitrogen gas was gently blown into the reaction mixture to purge the remaining gas therein.

The reaction mixture, after cooling, was filtered with zeolite to obtain 616 g of a colorless transparent liquid, which consists of diisobutyl aluminum hydride containing triisobutyl aluminum at a concentration of 8 mol. %.

63.7 of said diisobutyl aluminum hydride containing triisobutyl aluminum (8 mol. %) was employed in the synthesis of monosilane. In this case the amounts of diisobutyl aluminum hydride and triisobutyl aluminum were 0.4 moles and 0.035 moles, respectively.

The conditions and apparatus for monosilane synthesis were same as those described in the Example 1 except that a reaction temperature of 40° C. was employed and that helium was replaced by hydrogen.

The production of monosilane gas was 1.72 % under normal condition, corresponding to an yield of 77%.

The ratio of butane produced to monosilane was 0.25%, and that of monochlorosilane to monosilane was 4300 ppm.

EXAMPLE 6

There was investigated the effect of elimination of trialkyl aluminum by the addition of alkyl aluminum halide.

The apparatus employed for the synthesis of monosilane was same was that described in the Example 1.

52.9 g of a mixture of diethyl aluminum hydride (65 wt.%) and triethyl aluminum (35 wt.%) was diluted with 50 g of liquid paraffin. In this case the amounts of diethyl aluminum hydride and triethyl aluminum were 0.4 moles and 0.162 moles, respectively. Consequently triethyl aluminum existed at a concentration of 41 mol. % to diethyl aluminum hydride.

To said mixture added dropwise is 20.6 g (0.162 moles) of ethyl aluminum dichloride dissolved in 40 g of liquid paraffin. The amount of ethyl aluminum dichloride corresponds to stoichiometric conversion of triethyl aluminum in said mixture into diethyl aluminum monochloride.

Thus, after the dissolving of the above-mentioned three alkyl aluminum compounds, the ratio of triethyl aluminum to diethyl aluminum hydride was reduced to 0 mol. %.

The mixture thus obtained was degassed at 30° C. under a reduced pressure of 2 mmHg, and then was charged into a 500 ml autoclave under an atmosphere of hydrogen.

17.0 g (0.1 moles) of silicon tetrachloride dissolved in 28 g of liquid paraffin was charged from a constant rate pump over 2 hours into the autoclave maintained at 45° C. The generated monosilane gas was collected in the gas trap.

After the reaction was complete, the monosilane gas remaining in the reaction system was purged with hydrogen gas into the gas trap.

The composition of the trapped gas was determined with a gas chromatograph.

The production of monosilane gas was 2.02 % under normal condition, corresponding to an yield of 90%.

The ratio of ethane produced to monosilane (ethane/SiH$_4$) was 0.12%, and that of monochlorosilane to monosilane (SiH$_3$Sl/SiH$_4$) was 55 ppm.

EXAMPLE 7

A process similar to that described in the Example 6 was employed for reducing tetraethoxy silane.

In this case the amounts of three alkyl aluminum compounds were same as described before, but liquid paraffin was replaced by 100 ml of dried and deoxygenated toluene as the solvent. Also silicon tetrachloride dissolved in liquid paraffin was replaced by 20.8 g (0.1 moles) of tetraethoxy silane dissolved in 50 ml of dried and deoxygenated toluene.

The reaction was conducted for 1.5 hours at a temperature of 18° C.

The production of monosilane gas was 1.95 % under normal condition, corresponding to an yield of 87%. The ratio of ethane/SiH$_4$ was 0.4%.

REFERENCE EXAMPLE 4

The process of the Example 4 was reproduced except the addition of ethyl aluminum dichloride was omitted.

The production of monosilane in this case was 1.0 % under normal condition, corresponding to an yield of 45%, and the ratio of ethane/SiH$_4$ was 1.2%.

EXAMPLE 8

Disilane was synthesized from hexachlorodisilane (Si$_2$Sl$_6$) in the following manner:

(a) A 1-liter stainless steel autoclave equipped with an induction stirrer was connected to a pump for introducing Si$_2$Cl$_6$ through a dip tube into the autoclave, and was also provided with a dip tube for introducing an inert gas.

A discharge pipe for generated monosilane and disilane was connected to a trap cooled at -10° C., followed by a trap cooled at −130° C. for collecting disilane and a trap cooled with liquid nitrogen for collecting monosilane.

The entire system was filled with hydrogen at a pressure of 0.2 kg/cm$^2$ (gage pressure).

(b) Reduction of Si$_2$Cl$_6$ 79.5 g of a mixture of diethyl aluminum hydride (65 wt.%) and triethyl aluminum (35 wt.%) was diluted with 75 g of liquid paraffin. The amounts of diethyl aluminum hydride and triethyl aluminum in this case were 0.6 moles and 0.244 moles, respectively, so that the latter existed at a concentration of 41 mol. % to the former.

To said mixture added dropwise was 34.1 g (0.268 moles) of ethyl aluminum dichloride dissolved in 75 g of liquid paraffin. The amount of ethyl aluminum dichloride corresponded to 1.1 times of the amount required for converting triethyl aluminum into diethyl aluminum monochloride.

Thus, after the mixing of the above-mentioned three alkyl aluminum compounds, the ratio of triethyl aluminum to diethyl aluminum hydride was reduced to 0 mol. %.

The mixture thus obtained was degassed for 30 minutes at 30° C. and under a reduced pressure of 2 mmHg, and was then charged into a 500 ml autoclave under an atmosphere of hydrogen.

26.9 g (0.1 moles) of hexachlorodisilane dissolved in 75 g of liquid paraffin was added by a constant rate pump over 2 hours into the autoclave maintained at 40° C.

After the addition was completed, the mixture was agitated further for 1 hour. Subsequently the autoclave was heated to 60° C., and hydrogen gas was introduced for 3.5 hours at a rate of 0.2 ml/min.

The production of disilane was 1.75 % under normal condition, corresponding to an yield of 78%. REFERENCE EXAMPLE 5

The process of the Example 8 for synthesizing disilane was reproduced except that the dropwise addition of ethyl aluminum dichloride was omitted.

The production of disilane in this case was 0.18 % under normal condition, corresponding to an yield of 8%.

EXAMPLE 9

In the case of a mixture of diethyl aluminum hydride and triethyl aluminum containing fine powders of metallic aluminum, the effect of the aluminum fine powders was tested. The same apparatus as in Example 1 was used. 100 g of a mixture of 55 wt.% of diethyl aluminum hydride, 23 wt.% of triethylaluminum, 0.8 wt.% of aluminum fine powders and 21.2 wt.% of liquid paraffin was diluted with 50 g of liquid paraffin. In this case the amounts of diethyl aluminum hydride and triethyl aluminum were 0.64 moles and 0.202 moles, respectively. Consequently the triethyl aluminum existed at a concentration of 32 mol. % to diethyl aluminum hydride.

To said mixture was dropwise added 26.9 g (0.212 moles) of ethyl aluminum dichloride dissolved in 40 g of liquid paraffin. The amount of the ethyl aluminum dichloride corresponds to 1.05 times the amount necessary for converting triethyl aluminum to diethyl aluminum monochloride.

Consequently, after having mixed these three alkyl aluminum compounds the ratio of triethyl aluminum to diethyl aluminum hydride was 0 mol. %. The mixture of these three alkyl aluminum compounds was charged into an autoclave and degassed at 30° C. under reduced pressure of 2 mmHg for 30 minutes. Thereafter the atmosphere was converted to hydrogen gas.

27.2 g (0.16 moles) of silicon tetrachloride were dissolved in 20 g of liquid paraffin, which were then fed into an autoclave maintained at 40° C. by a constant rate pump over 2 hours. The generated monosilane gas was collected in a trap. gas remaining in the reaction system was charged into the trap by hydrogen to collect the same.

The composition of the trapped gas was determined with a gas chromatograph.

3.23 % of monosilane gas was produced and accordingly, the yield was 90%. The ratio of ethane produced to monosilane (ethane/SiH4) was 0.12% and that of monochlorosilane produced to monosilane (SiH3Cl/SiH4) was 50 ppm.

This example shows that the presence of metallic aluminum powders does not affect the yield of monosilane and amounts of impurities produced.

INDUSTRIAL APPLICABILITY

As mentioned above, in accordance with the preparation process of the present invention end products of high purity can be obtained with a high yield and further, the amount of by-products such as monochlorosilane and ethane is reduced. The process of the present invention is industrially advantageous in view of using the mixture of alkyl aluminum hydride and trialkyl aluminum which is available easily and at a low cost as a reducing agent.

What is claimed is:

1. In a process for producing silanes by reduction of a polyhalosilane of the general formula:

$$Si_nX_{2n+2}$$

wherein n is a positive integer and X is selected from the group consisting of hydrogen, halogen, alkyl, alkoxy, aryl and vinyl with a mixture of alkyl aluminum hydrides of the general formula:

$$R_1R_2AlH$$

wherein $R_1$ and $R_2$ are each independently selected from alkyl of 1 to 10 carbon atoms, inclusive, and trialkyl aluminum of the general formula:

$$R_1R_2R_3Al$$

wherein $R_1$ and $R_2$ have the same meaning ascribed to them above and $R_3$ represents alkyl of from 1 to 10 carbon atoms, inclusive, the improvement which comprises; fractionating said mixture of alkyl aluminum hydride and trialkyl aluminum by distillation, thereby lowering the content of trialkyl aluminum in said mixture to 10 mol. % or less of the alkyl aluminum hydride, prior to said reduction.

2. In a process for producing silanes by reduction of a polyhalosilane of the general formula:

wherein n is a positive integer and X is selected from the group consisting of hydrogen, halogen, alkyl, alkoxy, aryl and vinyl with a mixture of alkyl aluminum hydrides of the general formula:

$$R_1R_2AlH$$

wherein $R_1$ $R_2$ are each independently selected from alkyl of 1 to 10 carbon atoms, inclusive, and trialkyl aluminum of the general formula:

$$R_1R_2R_3Al$$

wherein $R_1$ and $R_2$ have the same meaning ascribed to them above and $R_3$ represents alkyl of from 1 to 10 carbon atoms, inclusive, the improvement, which comprises; pyrolyzing said mixture of alkyl aluminum hydride and trialkyl aluminum at a temperature within the range of from 160° C. to 180° C., thereby lowering the content of trialkyl aluminum in said mixture to 10 mol. % or less of the alkyl aluminum hydride prior to said reduction.

* * * * *